(12) United States Patent
Isozaki et al.

(10) Patent No.: US 7,685,422 B2
(45) Date of Patent: Mar. 23, 2010

(54) INFORMATION PROCESSING APPARATUS, INFORMATION PROCESSING METHOD, AND INFORMATION PROCESSING PROGRAM

(75) Inventors: Hiroshi Isozaki, Kanagawa-ken (JP); Takashi Kokubo, Tokyo (JP); Koji Kanazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1120 days.

(21) Appl. No.: 11/130,135

(22) Filed: May 17, 2005

(65) Prior Publication Data
US 2005/0259824 A1    Nov. 24, 2005

(30) Foreign Application Priority Data
May 18, 2004 (JP) ............................. 2004-147795
Apr. 25, 2005 (JP) ............................. 2005-126540

(51) Int. Cl.
*H04L 29/00* (2006.01)
(52) U.S. Cl. .................. 713/171; 713/168; 713/169; 713/170; 713/172; 713/173; 713/174; 713/175; 713/176; 713/177; 713/178; 713/179; 713/180; 713/181; 726/27; 726/28; 726/29; 726/30
(58) Field of Classification Search ......... 713/168–181; 380/201; 726/4, 27–30
See application file for complete search history.

(56) References Cited

U.S. PATENT DOCUMENTS 5,557,678 A * 9/1996 Ganesan ..................... 380/282
5,724,346 A * 3/1998 Kobayashi et al. .......... 370/329
7,188,245 B2 * 3/2007 Isozaki et al. ............... 713/171
2002/0039148 A1 * 4/2002 Yamamoto .................. 348/469
2002/0087656 A1 * 7/2002 Gargiulo et al. ............. 709/217
2003/0145214 A1   7/2003 Saito et al.

(Continued)

FOREIGN PATENT DOCUMENTS

EP    1182825 A2 *  2/2002

OTHER PUBLICATIONS

U.S. Appl. No. 11/017,054, filed Dec. 21, 2004, Kokubo.
U.S. Appl. No. 10/722,515, filed Nov. 28, 2003, Saito et al.

(Continued)

*Primary Examiner*—Nasser Moazzami
*Assistant Examiner*—Ghazal Shehni
(74) *Attorney, Agent, or Firm*—Oblon, Spivak, McClelland, Maier & Neustadt, L.L.P.

(57) ABSTRACT

An information processing apparatus has an authentication/key exchange unit, a round trip time measuring unit, a common key transmitter, a contents key transmitter and a contents transmitter. The round trip time measuring unit sends a round trip time measuring request generated to the communication apparatus through the first communication connection to measure the round trip time, and check whether the measured round trip time is within a predetermined time and whether a transmitting source of the round trip request response is the communication apparatus sharing the first key. The common key transmitter encrypts a second key used for contents transmission by using the first key and transmits the encrypted second key through the first communication connection when the round trip time measuring unit succeeds in the checking. The contents transmitter encrypts the contents requested by the communication apparatus by using the second key and sends the encrypted contents to the communication apparatus through the second communication connection.

26 Claims, 9 Drawing Sheets

U.S. PATENT DOCUMENTS

| | | |
|---|---|---|
| 2004/0053622 A1 | 3/2004 | Nakakita et al. |
| 2004/0168062 A1 | 8/2004 | Isozaki et al. |
| 2005/0027984 A1 | 2/2005 | Saito et al. |
| 2005/0114647 A1* | 5/2005 | Epstein .................. 713/153 |
| 2005/0118987 A1 | 6/2005 | Isozaki et al. |

OTHER PUBLICATIONS

U.S. Appl. No. 11/019,349, filed Dec. 23, 2004, Matsushita et al.
U.S. Appl. No. 11/034,845, filed Jan. 14, 2005, Isozaki et al.
U.S. Appl. No. 11/071,252, filed Mar. 4, 2005, Isozaki et al.
U.S. Appl. No. 11/085,531, filed Mar. 22, 2005, Isozaki et al.

* cited by examiner

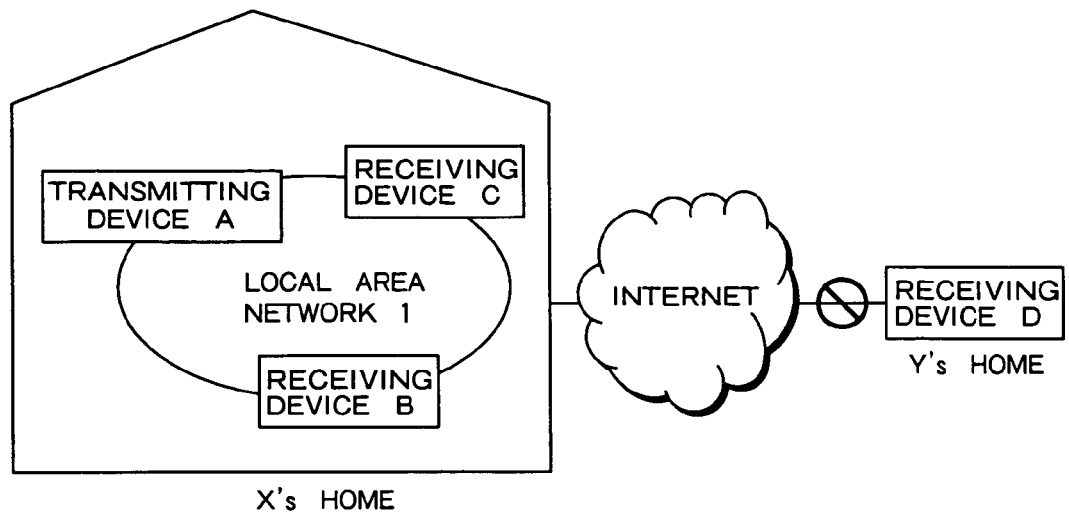
F I G. 1
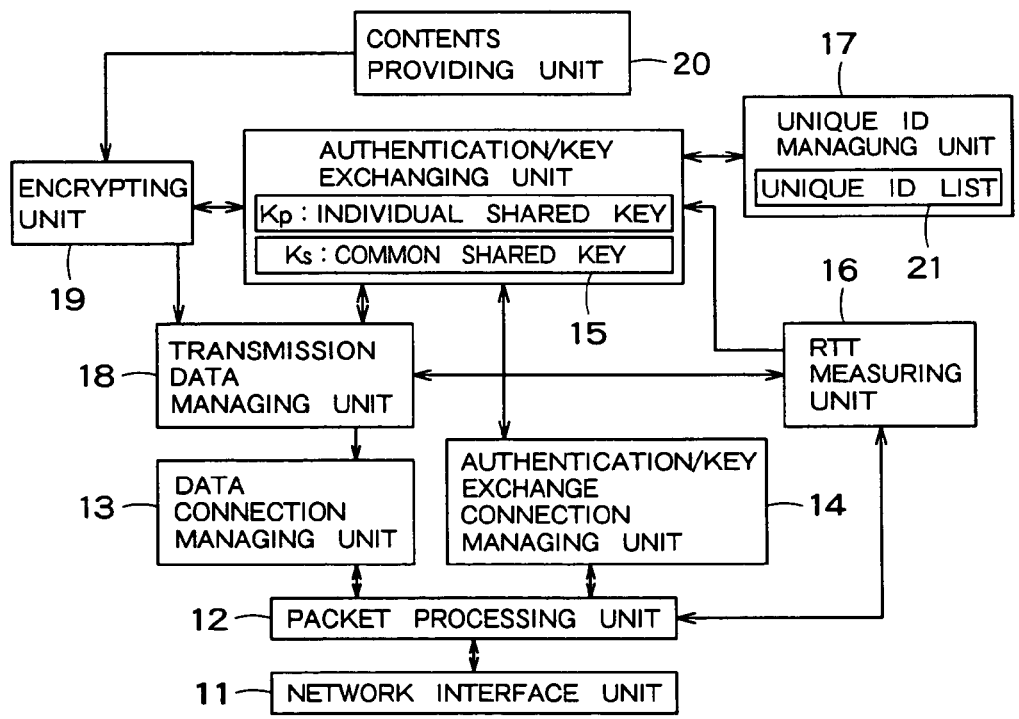
F I G. 2

| MANDATORY ITEMS | OPTION ITEMS | |
|---|---|---|
| UNIQUE ID | TIME OF REGISTRATION | DEVICE UNIQUE INFORMATION |
| AA | MONTH : DATE : TIME : MIN | XX.YY.ZZ.AA |
| BB | MONTH : DATE : TIME : MIN | AA.BB.CC.DD |
| CC | MONTH : DATE : TIME : MIN | EE.FF.OO.II |
| .... | .... | |

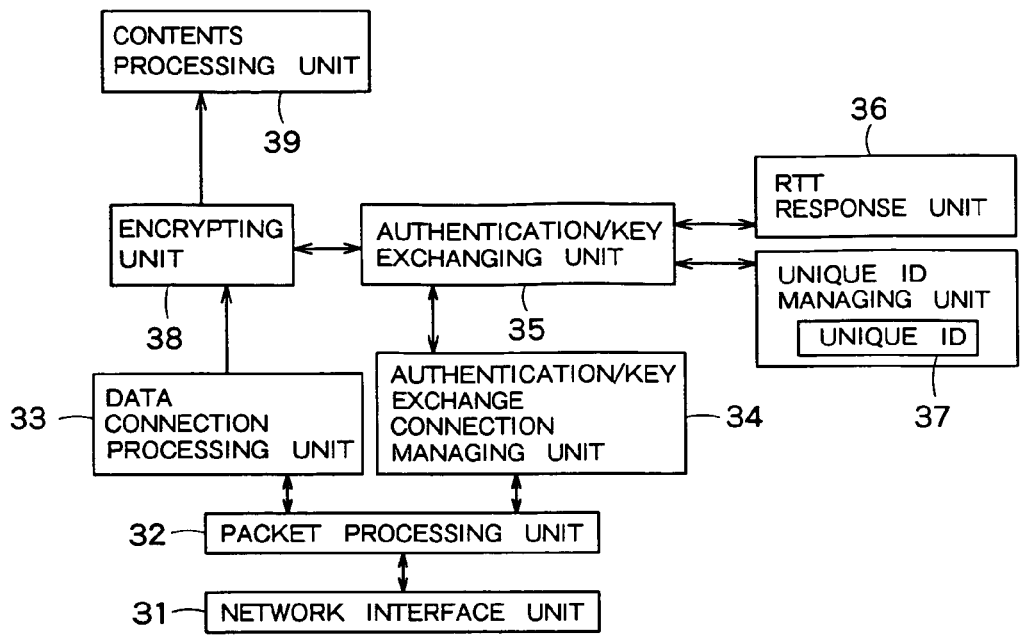
F I G. 5
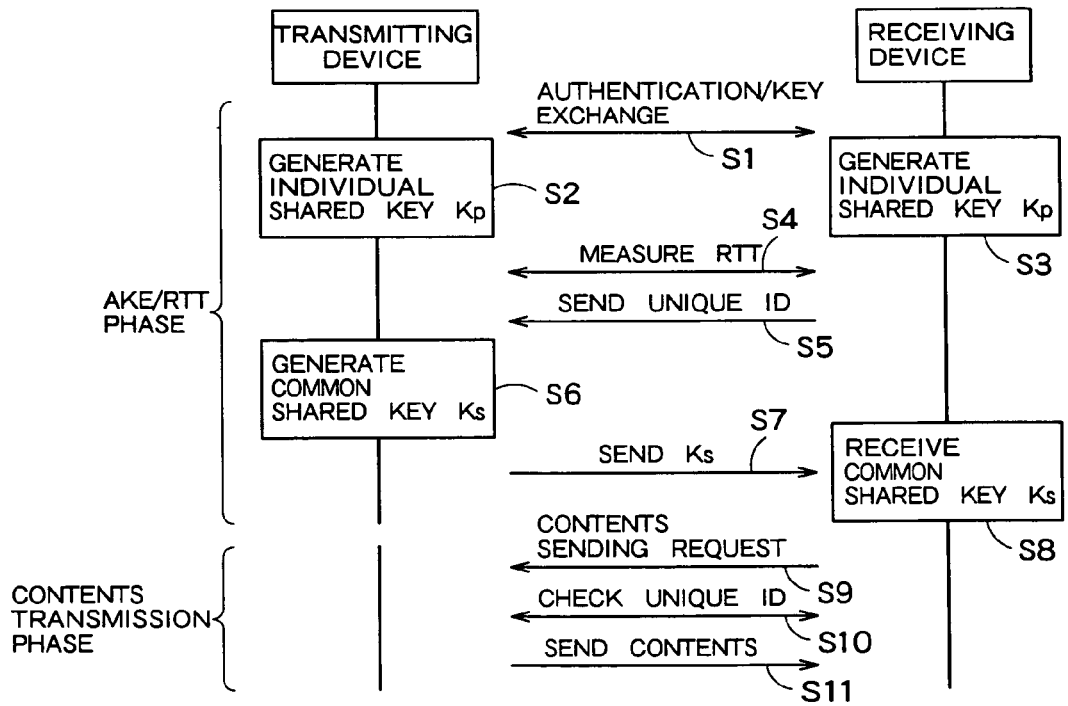
F I G. 6

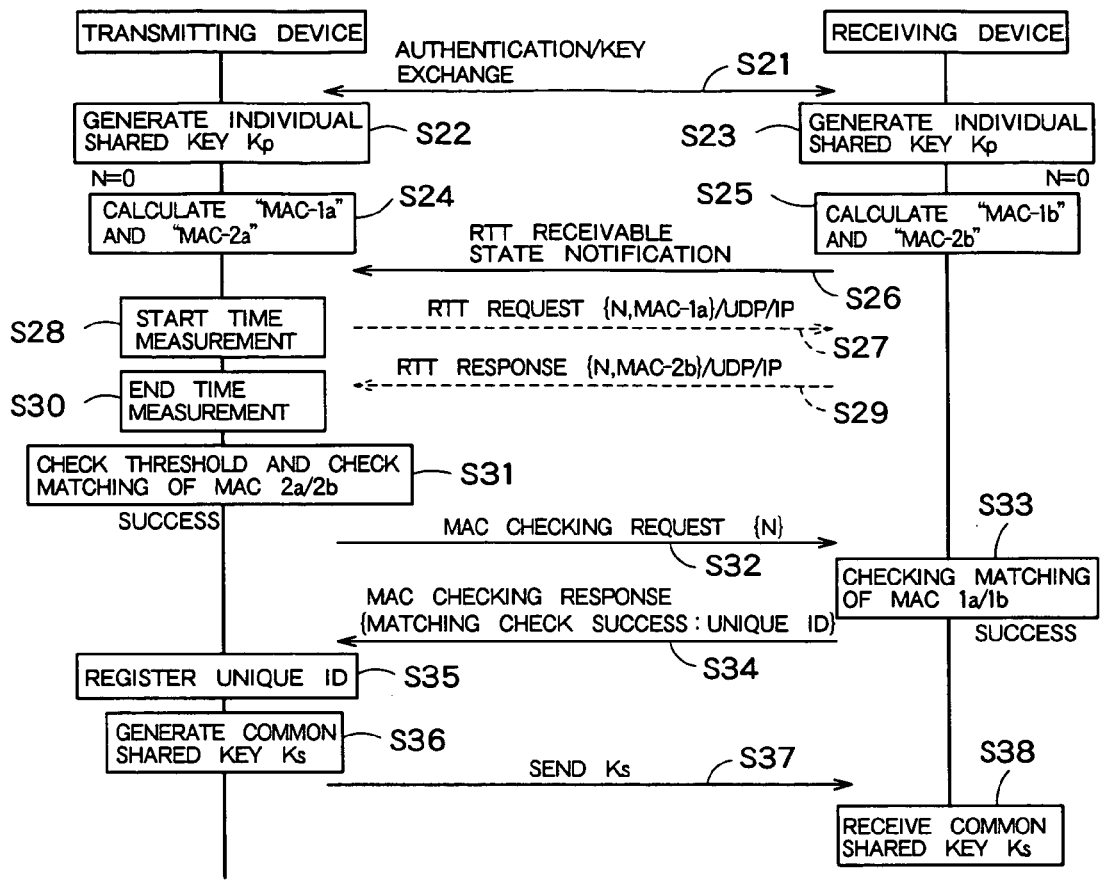
F I G. 7
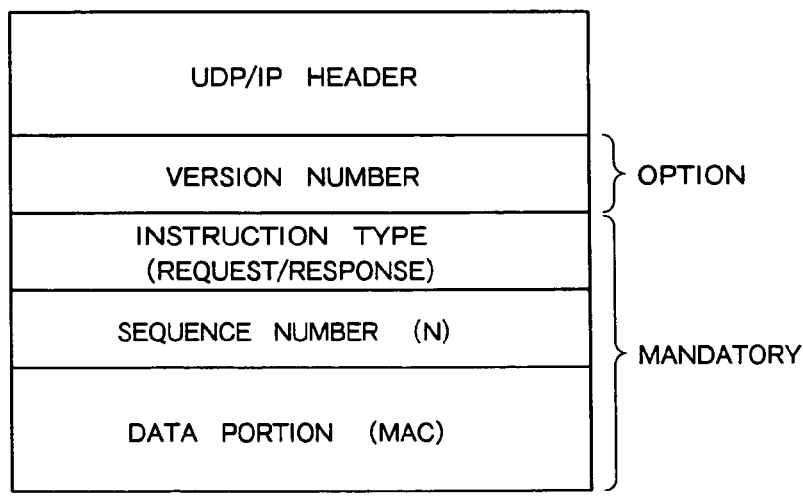
F I G. 8

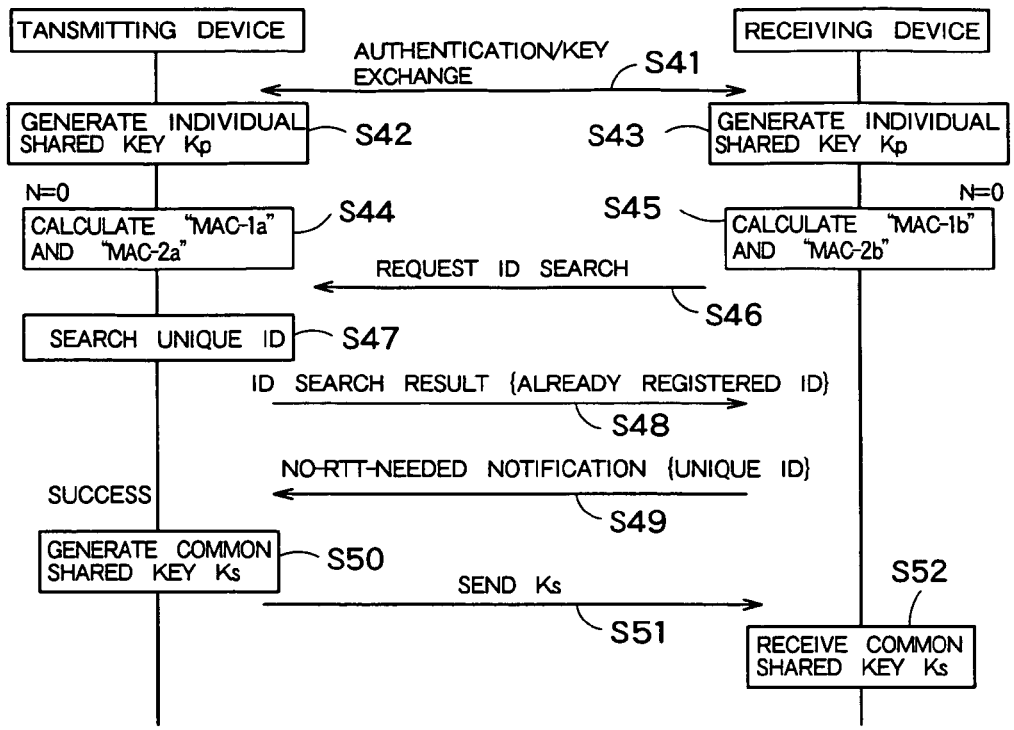
F I G. 9
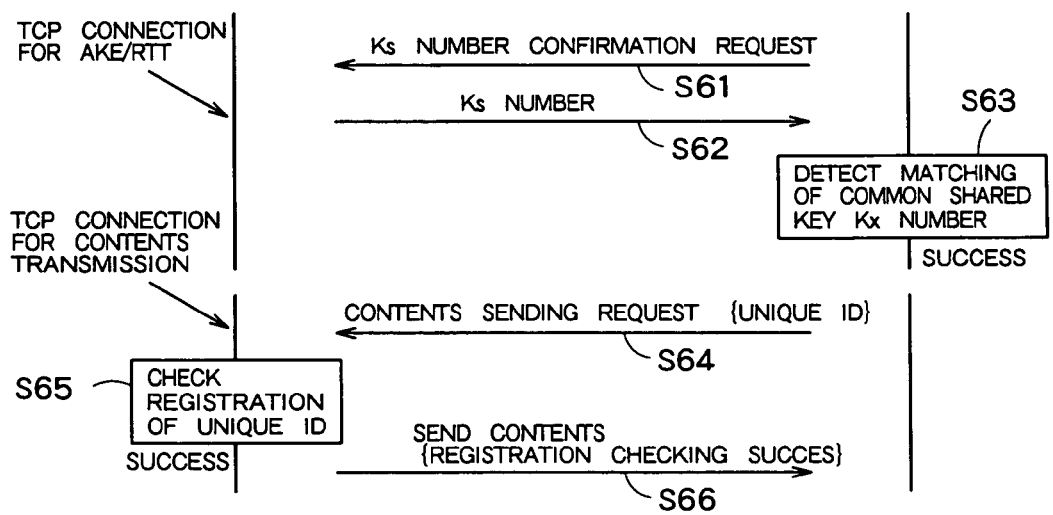
F I G. 10

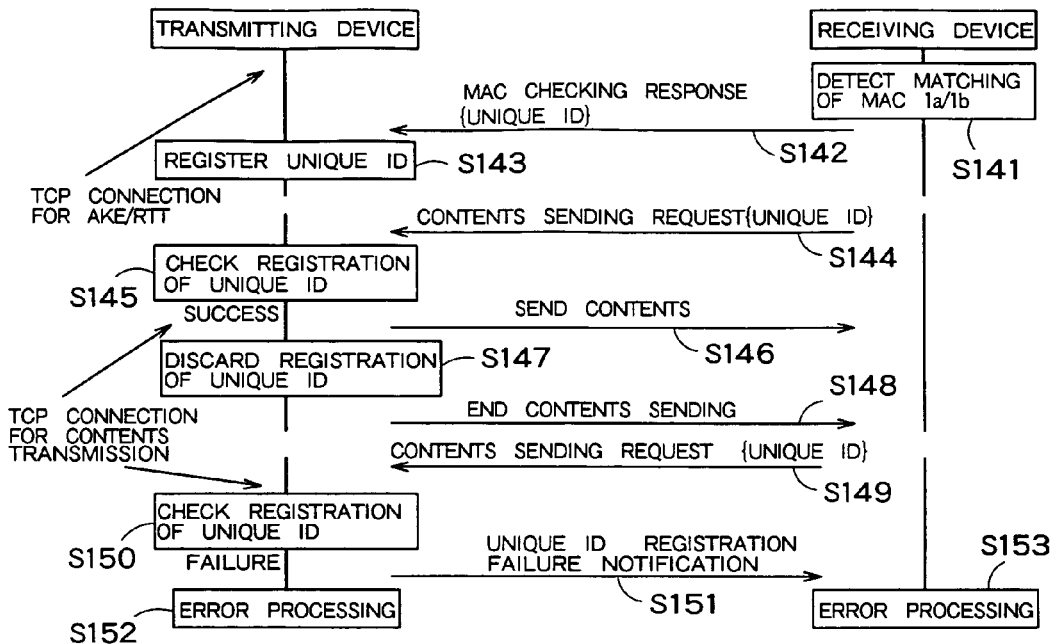
F I G. 14
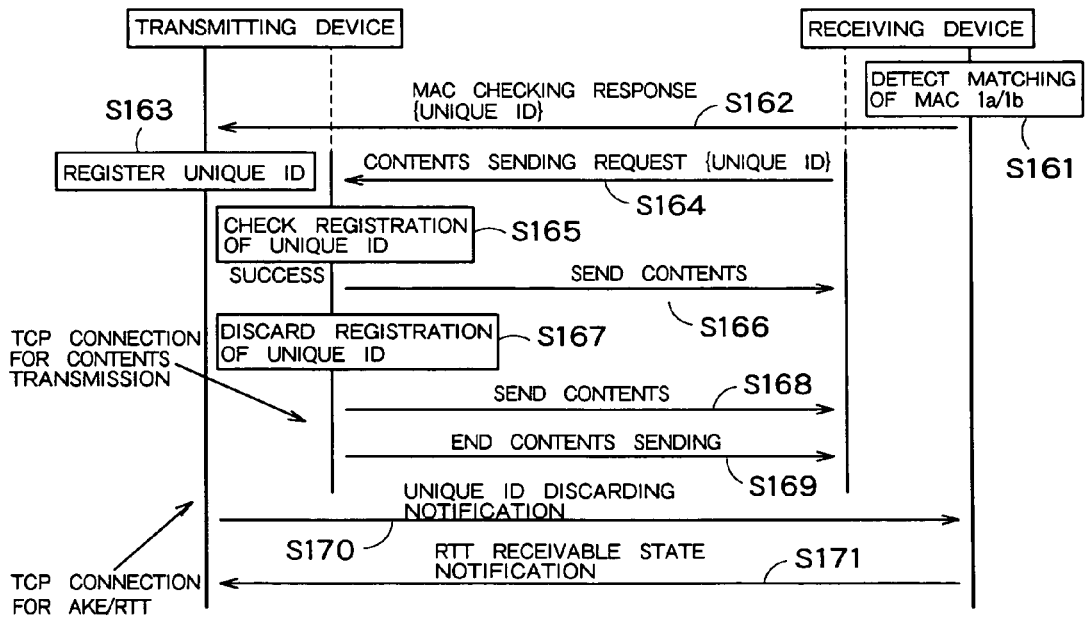
F I G. 15

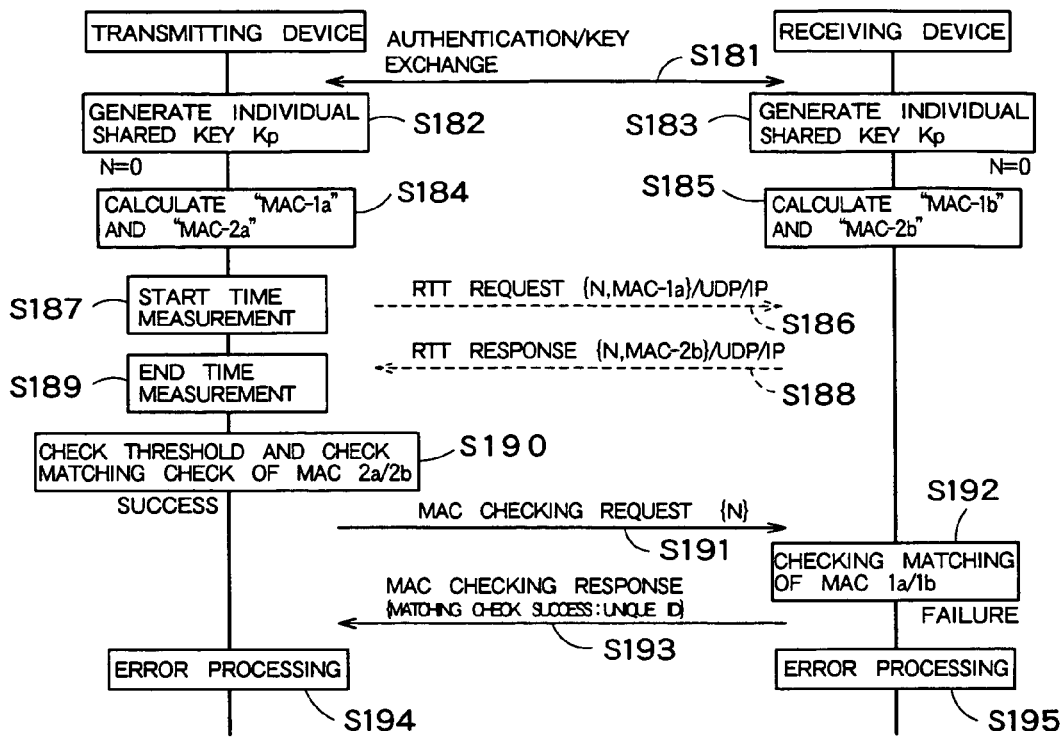
F I G. 16
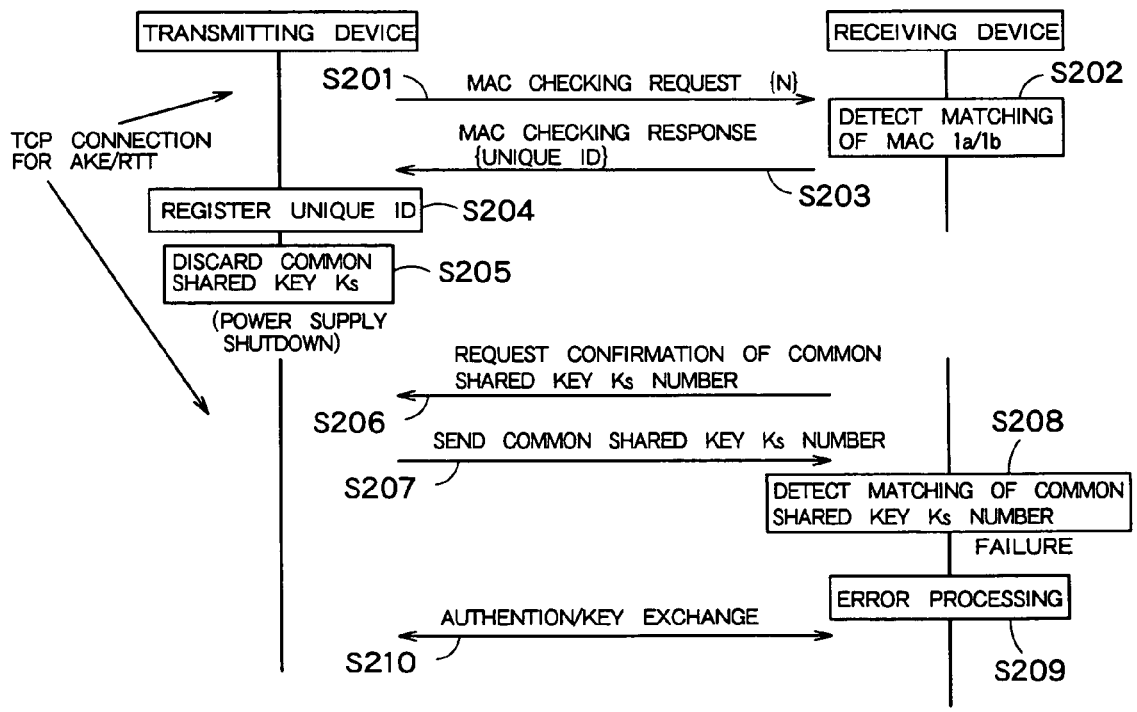
F I G. 17

INFORMATION PROCESSING APPARATUS, INFORMATION PROCESSING METHOD, AND INFORMATION PROCESSING PROGRAM

CROSS REFERENCE TO RELATED APPLICATIONS

This application is based upon and claims the benefit of priority from the prior Japanese Patent Application Nos. 2004-147795, filed on May 18, 2004 and 2005-126540, filed on Apr. 25, 2005, the entire contents of which are incorporated herein by reference.

BACKGROUND OF THE INVENTION

1. Field of the Invention

The present invention relates to an information processing apparatus, an information processing program, and an information processing method for transmitting and receiving various types of contents that has to be protected by copyright.

2. Related Art

With widespread use of computer networks such as broadband and wireless LANs and developments in digital technology, digital information devices (hereinafter referred to as a digital appliance) with communication functionality have become common. Also, it is conceivable that digitalized terrestrial broadcasts will propel the widespread use of digital-broadcast-ready television sets, set-top boxes, and DVD recorders. It will be advantageous if a user can enjoy watching or listening contents over a network by connecting a number of digital appliances to the network (Japanese Patent Application No. 2003-194491).

The term "contents" as used herein refers to various types of digital data such as MPEG2 and MEG4 video and audio data and document data such as text data and image data. Contents composed of such digital data have the advantage that they can be readily copied without degradation, but on the other hand, attention must be paid to their copyrights. For example, consider a case where copyrighted contents are transmitted from a transmitting device to a receiving device. It is desirable that the contents be exchanged within certain limits, for example within a range of legitimate rights, such as the rights of personal use prescribed by a Copyright Law or a narrower range to prohibit a user from providing the contents to a third party beyond such a range.

However, if AV data is transmitted by using the IP (Internet Protocol), a breach of the Copyright Law can occur because the IP (Internet Protocol) allows AV data to be transmitted without physical constraints such as the cable length constraints. For example, the IP provides VPN (Virtual Private Network), which is a general-purpose technique for logically connecting remote IP networks. This technology allows a device connected to the home network in Mr. X's house in area A to be connected to the home network in Mr. Y's house in area B (physically remote from area A) and to transmit data. That is, contents at Mr. X's home are not confined within the network at Mr. X's home, but Mr. Y at the remote site can connect to Mr. X's home network and browse the contents held by Mr. X.

SUMMARY OF THE INVENTION

The present invention has been made in view of the problem and an object of the present invention is to provide an information processing apparatus, an information processing method, and an information processing program that reliably prevent illegal use of contents and allow contents to be used effectively.

According to one embodiment of the present invention, an information processing apparatus which transmits encrypted contents for copyright protection to a communication apparatus via a network, comprising:

an authentication/key exchange unit configured to perform authentication/key exchange processing with the communication apparatus through a first communication connection, and generate a first key shared with the communication apparatus;

a round trip time measuring unit configured to send a round trip time measuring request generated by using the first key to the communication apparatus to measure the round trip time indicating a time that a measuring request response for the request is received, and check whether the measured round trip time is within a predetermined time and whether a transmitting source of the round trip request response is the communication apparatus sharing the first key;

an unique ID receiver which receives identification information unique to the communication apparatus encrypted by using the first key through the first communication connection when the round trip time measuring unit succeeds in the checking, and decrypts the unique identification information;

an ID register unit configured to register the identification information unique to the communication apparatus decrypted by the unique ID receiver;

a common key transmitter which encrypts a second key used for contents transmission by using the first key and sends the encrypted second key through the first communication connection when the round trip time measuring unit succeeds in the checking;

an ID decryption unit configured to receive a contents sending request sent from the communication apparatus through a second communication connection and decrypt identification information unique to the communication apparatus encrypted by the first key included in the contents sending request by using the first key;

an ID checking unit configured to check whether the unique identification information decrypted by the ID decryption unit is registered to the ID register unit; and a contents transmitter which encrypts the contents requested by the communication apparatus by using the second key and sends the encrypted contents to the communication apparatus through the second communication connection.

Furthermore, according to one embodiment of the present invention, an information processing apparatus which transmits encrypted contents for copyright protection to a communication apparatus via a network, comprising:

an authentication/key exchange unit configured to perform authentication/key exchange processing with the communication apparatus through a first communication connection, and generate a first key shared with the communication apparatus;

a round trip time measuring unit configured to send a round trip time measuring request generated to the communication apparatus through the first communication connection to measure the round trip time indicating a time that a measuring request response for the request is received, and check whether the measured round trip time is within a predetermined time and whether a transmitting source of the round trip request response is the communication apparatus sharing the first key;

a common key transmitter which encrypts a second key used for contents transmission by using the first key and transmits the encrypted second key through the first communication connection when the round trip time measuring unit succeeds in the checking;

a contents transmitter which encrypts the contents requested by the communication apparatus by using the second key and sends the encrypted contents to the communication apparatus through the second communication connection.

Furthermore, according to one embodiment of the present invention, an information processing apparatus which receives encrypted contents for copyright protection sent from a communication apparatus via a network, comprising:

an authentication/key exchange unit configured to perform authentication/key exchange processing with the communication apparatus by using a first communication connection and generate a first key shared with the communication apparatus;

a round trip time measuring request response transmitter which receives a round trip time measuring request sent from the communication apparatus, and sends a round trip time measuring request response by using the first key;

an ID transmitter which sends unique identification information encrypted by using the first key to the communication apparatus through the first communication connection when a round trip time measurement conducted with the communication apparatus fulfills a predetermined condition;

a common key receiver which receives a second key encrypted by using the first key, which is sent by the communication apparatus through the first communication connection, when the round trip time measurement fulfills the predetermined condition;

a contents request transmitter which sends a contents sending request to the communication apparatus through a second communication connection; and a contents receiver which receives the contents encrypted by using the second key, which is sent from the communication apparatus through the second communication connection, and decrypts the contents.

Furthermore, according to one embodiment of the present invention, an information processing apparatus which receives encrypted contents for copyright protection sent from a communication apparatus via a network, comprising:

an ID transmitter which sends an authentication request and unique identification information to the communication apparatus through a first communication connection;

an authentication/key exchange unit configured to perform authentication/key exchange processing with the communication apparatus by using the first communication connection and generate a first key shared with the communication apparatus;

a round trip time measuring request response transmitter which receives a round trip time measuring request sent from the communication apparatus, and sends a round trip time measuring request response by using the first key;

a common key receiver which receives a second key encrypted by using the first key, which is sent by the communication apparatus through the first communication connection, when a result of the round trip time measurement fulfills the predetermined condition;

a contents request transmitter which sends a contents request to the communication apparatus through a second communication connection; and a contents receiver which receives the contents encrypted by using the second key, which is sent from the communication apparatus through the second communication connection, and decrypts the contents.

Furthermore, according to one embodiment of the present invention, an information processing method which transmits encrypted contents for copyright protection from a first communication apparatus to a second communication apparatus via a network, comprising:

performing an authentication/key exchange processing between the first and second communication apparatuses through a first communication connection, to generate a first key shared between the first and second communication apparatuses;

transmitting a round trip time measuring request from the first communication apparatus to the second communication apparatus through the first communication connection, measuring a round trip time indicating a time that a measuring request response for the request is received, checking whether the measured round trip time is within a predetermined time and sharing the first key between the first and second communication apparatuses;

encrypting a second key used for contents transmission and transmitting the second key to the second communication apparatus through the first communication connection when the first communication apparatus succeeds in both of the checking; and encrypting contents requested from the second communication by using the second key, and transmitting the encrypted contents to the second communication apparatus through a second communication connection.

Furthermore, according to one embodiment of the present invention, an information processing program capable of executing by computer, which transmits encrypted contents for copyright protection from a first communication apparatus to a second communication apparatus via a network, the steps of comprising:

performing an authentication/key exchange processing between the first and second communication apparatuses through a first communication connection, to generate a first key shared between the first and second communication apparatuses;

transmitting a round trip time measuring request from the first communication apparatus to the second communication apparatus through the first communication connection, measuring a round trip time indicating a time that a measuring request response for the request is received, checking whether the measured round trip time is within a predetermined time and sharing the first key between the first and second communication apparatuses;

encrypting a second key used for contents transmission and transmitting the second key to the second communication apparatus through the first communication connection when the first communication apparatus succeeds in both of the checking; and encrypting contents requested from the second communication by using the second key, and transmitting the encrypted contents to the second communication apparatus through a second communication connection.

BRIEF DESCRIPTION OF THE DRAWINGS

FIG. 1 schematically shows a configuration of contents transmitting and receiving system including an information processing apparatus according to the present invention.

FIG. 2 is a block diagram showing a schematic configuration of a transmitting device A according to one embodiment of the present invention.

FIG. 5 is a block diagram schematically showing a configuration of the receiving device B according to one embodiment of the present invention.

FIG. 6 is a sequence diagram showing an example of a general process performed between a transmitting device A and the receiving device B.

FIG. 7 is a sequence diagram showing an example of an AKE/RTT measurement phase process performed between the transmitting device A and the receiving device B.

FIG. 8 is a diagram showing an example of the packet format of the RTT request and the RTT response that follows it.

FIG. 9 is a sequence diagram showing an example of a process in which only an ID registration check is performed without performing an RTT check.

FIG. 10 is a sequence diagram showing an example of contents transmission phase process performed between a transmitting device A and the receiving device B.

FIG. 14 is a sequence diagram showing an example of error handling performed if an ID registration check fails on a transmitting device in contents transmission phase.

FIG. 15 is a sequence diagram showing one example of a processing which defines a command for notifying the receiving device that the transmitting device discards the unique ID of the receiving device.

FIG. 16 is a sequence diagram showing an example of a process for transmitting an error message to a transmitting device if matching of MAC-1$a$ and MAC-1$b$ in a MAC check fails.

FIG. 17 is a sequence diagram showing an example of error handling performed by the receiving device.

DETAILED DESCRIPTION OF THE INVENTION

Figures 3, 4:
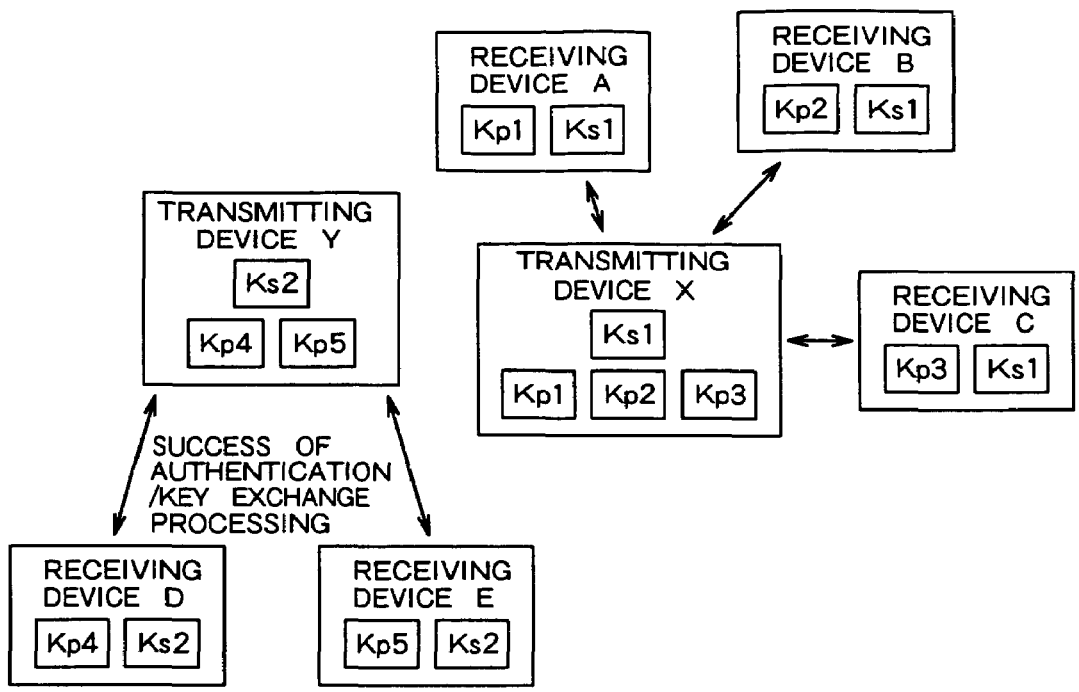
FIG. 3 is a diagram showing how the transmitting device and receiving devices share the individual shared key "Kp" and the common shared key "Ks".
FIG. 4 is a diagram showing an example of the unique ID list 21 stored in the unique ID managing unit 17.

An embodiment of the present invention will be described with reference to the accompanying drawings.

First Embodiment

FIG. 1 schematically shows a configuration of contents transmitting and receiving system including an information processing apparatus according to the present invention. The contents transmitting and receiving system shown in FIG. 1 is intended to transmit and receive mainly AV data for the purpose of personal use within a certain range, and includes a transmitting device A and receiving devices B and C connected to a local area network 1 and a receiving device D connected to the local area network 1 through the Internet. The receiving device D connected to the Internet may be connected to the local area network through a router, which is not shown. At least one of the transmitting device A and receiving devices B to D is an embodiment according to the information processing apparatus of the present invention.

The physical layer and link layer of the local area network 1 may be in any forms such as IEEE 802.11-compliant wireless LANs, Ethernet®, or IEEE 1394 networks. If the local area network 1 uses the Internet Protocol (hereinafter simply referred to as IP), the network layer of the local area network 1 may be IPv4 or IPv6. In addition to the transmitting device A and receiving devices B and C, other devices may be connected to the local area network 1, which are not shown for simplicity.

The term contents as used herein refers to a digital contents, including video data such as MPEG2 or MPEG4 video data, audio data such as MP3 audio data, and document data such as text data and image data. For simplicity of description, examples will be described in which the contents are digital contents (hereinafter simply referred to as contents) on which copyrights are secured before being transmitted.

Consider a case where contents are transmitted from transmitting device A to receiving devices B, C, and D. Care must be taken of the copyright of the content. As stated above, it is desirable that contents be exchanged within certain limits, for example within the range of legitimate rights, such as the rights of personal use prescribed by the Copyright Law or the narrower range to prohibit third parties from providing the contents to a third party beyond such a range. Contents are allowed to be transmitted from Mr. X's transmitting device A to receiving devices B and C, whereas contents are prevented from being transmitted from transmitting device A to receiving device D that is owned by a different person.

The embodiment has three main features.

(First Feature)

If an IP is used, data can be sent and received without limitations of the physical transmission distance. Accordingly, contents may be transmitted from a transmitting device to a receiving device beyond a home IP network.

Therefore, according to the present embodiment, a round trip time (hereinafter simply referred to as an RTT) is used to make sure that the distances between the transmitting device and the receiving device is within a certain range. Before contents is transmitted from the transmitting device to the receiving device, the RTT between the transmitting device and the receiving device is measure and, if the measured RTT is less than or equal to a certain threshold, contents is allowed to be sent. If the RTT exceeds the threshold, transmission of the contents is rejected.

(Second Feature)

Some home network configurations have a router or a bridge between the transmitting device and the receiving device. For example, if the transmitting device having a wired interface communicates with the receiving device having a wireless interface, typically a wireless access point is used to bridge the media.

If a large amount of traffic passes through the wireless access point between other devices than the transmitting device and the receiving device, a larger amount of time will be required for the wireless access point to bridge them and consequently the amount of RTT measured between the transmitting device and the receiving device will be larger than when there is no traffic.

If the threshold of RTT is set to an excessively large value in order to avoid the problem, communications between the transmitting device connected to the home network and the receiving device provided outside the home will be possible and thus the first feature will be unable to be achieved. Thus, if RTT is specified in a layer above the IP layer, it is difficult to determine a threshold of RTT because the RTT is susceptible to the amount of traffic on the transmission channel.

Therefore, once the RTT between the transmitting device and the receiving device is successfully measured, a unique ID held by one of the devices is registered in the other and, if contents are to be transmitted to the registered device, measurement of the RTT can be omitted, rather than measuring the RTT by the transmitting device and receiving device each time contents are transmitted. Thus, once the RTT has been successfully measured and the unique ID has been registered while there is no traffic on the home network, contents can be transmitted between the registered devices irrespective of the state of traffic next time connection is established between them.

(Third Feature)

If transmission of contents is permitted only by checking whether a unique ID has been registered, communication between the transmitting device and the receiving device can be made possible regardless of the physical distance between them by bringing them near to each other only to register the unique ID. That is, if the transmitting device and the receiving device are provided in a close range from each other and then the RTT is measured and a unique ID is registered, the receiving device can be taken out of the home and used for subsequent communications with the transmitting device.

Therefore, the output time and/or the data amount of contents transmitted from the transmitting device to the receiving device is measured and, when the contents are sent for a predetermined time contents (or a predetermined amount of the contents has been transmitted), the registered unique ID is deleted. Thus, the first and second features can be achieved and also the third features can be achieved without loss of convenience.

To implement the first to third features, the present embodiment provides, as a method for limiting the range within which contents are delivered, a process in which, prior to transmission of the contents from the transmitting device to the receiving device, the round trip time between them is measured to check whether they are located in a close range from each other and, if so, unique IDs of both devices or a unique ID of one of the devices is "registered" in the other device. Furthermore, a mechanism is provided in which whether the registrations has been completed is determined when contents are transmitted and a registered-unique-ID expiration time is set.

An example will be described below in which the receiving device B shown in FIG. 1 requests the transmitting device A to send contents and receives the contents.

FIG. 2 is a block diagram showing a schematic configuration of a transmitting device A according to one embodiment of the present invention. As shown in FIG. 2, the transmitting device A includes a network interface unit 11, a packet processing unit 12, a data connection managing unit 13, an authentication/key exchange connection managing unit 14, an authentication/key exchanging unit 15, an RTT measuring unit 16, a unique ID managing unit 17, a transmission data managing unit 18, an encrypting unit 19, and contents providing unit 20.

The network interface unit 11 performs physical layer processing and data link layer processing for communication with a receiving device B. The packet processing unit 12 performs network layer/transport layer processing for communication with the receiving device B. The authentication/key exchanging unit 15 performs authentication and key exchange with the receiving device B. The data connection managing unit 13 manages connections for contents transmission. The authentication/key exchange connection managing unit 14 manages connections for authentication/key exchange.

The authentication/key exchanging unit 15 uses an individual shared key "Kp" and a common shared key "Ks" as secret keys used for encrypting and decrypting contents with each receiving device if authentication/key exchange is successful. The individual shared key "Kp" means a key calculated and generated by each of the transmitting device and the receiving device individually by using a random number exchanged between them during authentication/key exchange procedure. The common shared key "Ks" means a key shared with all receiving devices with which authentication/key exchange has been successfully performed. The Ks is used for encrypting and decrypting a content. The Kp is used by the transmitting device for transmitting its Ks to the receiving device or used by the receiving device for encrypting and transmitting its unique ID to the transmitting device. FIG. 3 shows how the transmitting device and receiving devices share the individual shared key "Kp" and the common shared key "Ks".

Authentication/key exchange is a process in which each of the transmitting device and the receiving device validates that the device has been licensed properly by a licensing organization and, if they are successfully authenticated, the common shared key is generated. A well-known method such as ISO/IEC 9798-3 or ISO/IEC 97982 method may be used for the authentication.

The encrypting unit 19 uses a key shared through authentication/key exchange to encrypt contents, the random number, and the unique ID. The encryption algorithm for encrypting and decrypting these items of data may be a well-known algorithm such as AES. The contents providing unit 20 provides contents to the encrypting unit 19.

The RTT measuring unit 16 measures RTT with a receiving device B, determines whether the measured vale is less than or equal to a threshold, and provides the result to the authentication/key exchanging unit 15. The unique ID managing unit 17 has a unique ID list 21 within it.

FIG. 4 shows an example of the unique ID list 21 stored in the unique ID managing unit 17. The unique ID list 21 consists of mandatory items and optional items. The mandatory items are the unique IDs of other communication devices (receiving devices B) and the optional items include the date and time of registration of unique IDs in the unique ID list 21 and communication-device-unique information such as the MAC address of the network interface unit 11.

The unique ID list can contain a finite number of unique IDs (for example N unique IDs). That is, the unique ID managing unit 17 has a RAM area for storing the unique ID list 21.

A unique ID is received from a communication partner and added to the unique ID list 21 only if it is determined that the RTT measured by RTT measurement performed by the RTT measuring unit 16 with the receiving device is less than or equal to a predetermined threshold.

It is desirable that the unique IDs held by the transmitting device A and the receiving device B are uniquely assigned based on a license, regardless of manufacturers. If the unique ID is already included in the unique ID list 21, the authentication/key exchanging unit 15 is informed of that fact.

If the unique ID list 21 contains the registration date and time field as an optional item field, the date and time may be updated when a unique ID is registered. Furthermore, if N unique IDs are already registered, a message may be displayed that prompts a user to choose whether to reject addition of a new unique ID or delete the unique ID with the oldest registration date and time and then add the unique ID if the registration date and time item are contained, or prompts to the user to select a unique ID to delete. Any unique ID may be deleted. The unique ID managing unit 17 searches the unique ID list 21 for the unique ID received from the receiving device.

The transmission data managing unit 18 measures and records the transmission time of contents sent to the receiving device or the data amount of the contents on a receiving-device-by-device basis. To identify the receiving device to which contents was transmitted, its unique ID on the unique ID list may be used. The encrypting unit 19 encrypts contents to be transmitted by the transmitting device A.

It is assumed in the following example that information processed by the packet processing unit 12 is transmitted by using the Internet Protocol.

FIG. 5 is a block diagram schematically showing a configuration of the receiving device B according to one embodiment of the present invention. As shown in FIG. 5, the receiving device B includes a network interface unit 31, a packet processing unit 32, a data connection managing unit 33, an authentication/key exchange connection managing unit 34, an authentication/key exchanging unit 35, an RTT responding unit 36, a unique ID managing unit 37, an encrypting unit 38, and contents processing unit 39.

The network interface unit 31 performs a physical layer processing and a data link layer processing for communicating with a transmitting device A. The packet processing unit 32 performs a network layer/transport layer processing for communicating with the transmitting device A. The authentication/key exchanging unit 35 performs an authentication/key exchange with the transmitting device A. The data connection managing unit 33 manages connections for transmitting and receiving contents. The authentication/key exchange connection managing unit 34 manages a connection for authentication/key exchange. The RTT responding unit 36 performs a response processing concerning RTT according to a RTT request sent from the transmitting device A. The unique ID managing unit 37 stores the unique ID of the receiving device B and sends the unique ID to the transmitting device A. The encrypting unit 38 decrypts contents received and encrypts the unique ID. The contents processing unit 39 outputs a received contents onto a display or stores a received content.

The network interface unit 31, the packet processing unit 32, and the authentication/key exchange unit 35 may have the same configurations as those of the transmitting device A.

(Process Sequence: AKE/RTT Measurement Phase)

FIG. 6 is a sequence diagram showing an example of a general process performed between a transmitting device A and the receiving device B. In the present embodiment, two phases, a "AKE/RTT measurement phase" and a "contents transmission phase" are performed when contents are transmitted from the transmitting device A to the receiving device B.

The "AKE/RTT measurement phase" is one in which the transmitting device A and the receiving device B perform authentication/key exchange and RTT measurement.

The "contents transmission phase" is one in which an ID registration check is made to determine whether the transmitting device A has the unique ID of the receiving device B prior to transmission of contents and contents transmission is performed.

The "AKE/RTT measurement phase" is always performed before the "contents transmission phase". TCP connection for performing authentication/key exchange in the AKE/RTT measurement phase differs from TCP connection for contents transmission in the contents transmission phase. That is, different numbers are assigned to a TCP port for authentication/key exchange and a TCP port for contents transmission.

The transmitting device first performs authentication/key exchange with the receiving device (step S1). As a result, the transmitting device and the receiving device generate and share an individual shared key Kp (steps S2 and S3). Next, the transmitting device and the receiving device measure RTT (step S4). If the RTT falls within a certain threshold, the receiving device sends its unique ID to the transmitting device (step S5). The transmitting device receives the ID and registers it in its unique ID list 21. Finally, the transmitting device generates the common shared key Ks (step S6), encrypts it with Kp, and sends the encrypted Ks to the receiving device (steps S7 and S8). As a result, the receiving device and the transmitting device share the common shared key Ks. A general outline of a process performed in the AKE/RTT phase has been described.

Then, the contents transmission phase is performed. First, the receiving device sends contents send request to the transmitting device (step S9). Then, the receiving device sends its unique ID to the transmitting device (step S10) and the transmitting device searches the unique ID list 21 to determine whether the unique ID is registered in the unique ID list 21 (step S11). If it is determined that the unique ID of the receiving device is registered in the transmitting device, the transmitting device encrypts contents by using the common shared key Ks generated in the AKE/RTT measurement phase and sends it to the receiving device.

The "AKE/RTT measurement phase" and the "contents transmission phase" will be detailed below.

(First Example of the AKE/RTT Measurement Phase)

FIG. 7 is a sequence diagram showing an example of an AKE/RTT measurement phase process performed between the transmitting device A and the receiving device B. In the AKE/RTT measuring process shown in FIG. 7, the RTT between the transmitting device A and the receiving device B is measured and the unique ID of the receiving device B is registered in the transmitting device A.

First, the transmitting device A and the receiving device B performs authentication/key exchange to determine whether they are valid devices (step S21) to each other and share the individual shared key Kp (steps S22 and S23). If the authentication fails, predetermined error handling is performed without performing the subsequent part of the process.

In addition, the version number of a certificate exchanged between the transmitting and receiving devices during the authentication/key exchange process may be used by each of them to make determination as to whether the other has the capability of performing the RTT measuring process described below. If the version number written on the certificate is larger than or equal to a certain version number, the RTT measuring process is performed after the authentication/key exchange process. Otherwise, the transmitting device generates a common shared key Ks, encrypts it with the Kp, and sends the encrypted Ks to the receiving device without performing the RTT measuring process.

Then, each of the receiving and transmitting devices uses an initial value, random numbers, and the individual shared key Kp to generate a message authentication code (hereinafter simply referred to as MAC) (steps S24 and S25). The MAC exchanged between transmitting device and receiving device may be the high-order X bits and the low-order Y bits of a value generated by encrypting the initial value N and random numbers Ra and Rb as represented by equations (1) and (2) below with the individual shared key Kp. MAC-1$a$ and MAC-2$a$ are generated on the transmitting device and MAC-1b and MAC-2b are generated on the receiving device. The transmitting device sends MAC-1a to the receiving device, where it is compared with MAC-1b. The receiving device sends MAC-2b to the transmitting device, where it is compared with MAC-2a.

$$\text{MAC-1}a = \text{MAC1}b = \text{encryption}(Kp, Ra\psi Rb\psi N)\text{high-order } X \text{ bits} \quad (1)$$

$$\text{MAC-2}a = \text{MAC2}b = \text{encryption}(Kp, Ra\psi Rb\psi N)\text{low-order } Y \text{ bits} \quad (2)$$

where the notation "$\psi$" denotes the concatenation.

Random numbers used in the authentication/key exchange process may be reused as the random numbers Ra and Rb, or Ra and Rb may be generated by the transmitting device and receiving device, respectively, and exchanged between them in unencrypted form prior to generation of the MACs. N is the initial value shared between the transmitting device and receiving device beforehand. Because N does not need to be secret and therefore may be shared as a value written in documents such as specification sheets and notified by the transmitting device to the receiving device by transmitting the value of N in unencrypted form prior to generation of the MACs. Hereinafter N is referred to as the sequence number.

The algorithm used for encrypting the random numbers Ra and Rb and the initial value N may be a well-known algorithm such as AES. If MAC-1 and MAC-2 require a bit length longer than a cipher block, a well-known technique such as CBC mode may be used to chain cipher blocks.

While the MACs are generated by using individual shred key Kp in equations (1) and (2) described above, the common shared key Ks may be used instead of the individual shared key Kp to generate the MACs.

The receiving device sends a ready-to-receive-RTT notification indicating that the calculation of the MAC has been successfully completed, to the transmitting device (step S26). The reason why the ready-to-receive-RTT is transmitted is that the receiving device has to send back an RTT response immediately to an RTT request from the transmitting device. If the receiving device received an RTT request while calculating the MAC, more time would be required before returning an RTT response than when there is no calculation load. Therefore it is desirable that the receiving device calculate the MAC beforehand. The receiving device therefore sends the ready-to-receive-RTT-state notification to the transmitting device in order to notify it that the receiving device is ready for immediately responding to an RTT request.

When receiving this state notification, the transmitting device inserts MAC-1a calculated using the sequence number N in an RTT request and sends the RTT request (step S27). Measurement of RTT time is started at this point of time (step S28).

In response to the RTT request, the receiving device which has received the RTT request inserts MAC-2a corresponding to the received sequence number N in an RTT response and sends the RTT response to the transmitting device (step S29).

FIG. 8 shows an example of the packet format of the RTT request and the RTT response that follows it. As shown in FIG. 8, RTT is sent as an UDP datagram. The payload of the UDP datagram for use in RTT consists of mandatory items and optional items. The mandatory items include three items: an instruction type, a sequence number, and data. The optional items include a version number. The instruction type is used for identifying the RTT request or response. The sequence number field is used for identifying the RTT request or response among the RTT requests or responses sent from the transmitting device to the receiving device and contains the value N used for calculating the MAC. Each time the transmitting device sends a UDP datagram for an RTT request, it increments the value of N by a constant amount (for example by one). The data field of an RTT request contains MAC-1a calculated as shown in equation (1) calculated by using the sequence number N. For an RTT response, the data field contains MAC-2b calculated by using the sequence number N as shown in equation (2).

When receiving the RTT response, the transmitting device stops time counting and measures the time that has elapsed since it sent the RTT request (step S30). If the measured time is less than or equal to a predetermined threshold, the transmitting device checks to determine whether MAC-2a received in the RTT response matches MAC-2b calculated in the transmitting device (step S31).

If the check is successful, the transmitting device sends a message (MAC check request) indicating the sequence number (N) of the matching MAC to the receiving device (step S32).

The receiving device receives the message and checks whether MAC-1a contained in the data field of the RTT request matches with pre-calculated MAC-1b (step S33). The MAC-1b is the value calculated by using N received from the transmitting device (step S32); MAC-1a is the value contained in the payload with the sequence number N received from the transmitting device. If they match, the receiving device encrypts and sends a message indicating the match and the unique ID of the receiving device (a MAC check response) (step S34). The individual shared key Kp is used for the encryption. The transmitting device decrypts the unique ID and registers it in the unique ID list 21 in the unique ID managing unit (step S35).

Finally, the transmitting device generates a common shared key Ks (step S36), encrypts it with Kp, and sends it to the receiving device (steps S37 and S38). While transmitting of the common shared key Ks (steps S37 and S38) is defined as a separate command in the sequence shown in FIG. 7, it is essential only that Ks be sent when an RTT measurement threshold check and validation of the MAC have succeeded in the transmitting device side and Ks encrypted with the sequence number N and Kp may be sent along with the MAC check request (step S32).

Besides the unique ID sent in the MAC check response, the unique ID contained in a certificate exchanged between the transmitting device and the receiving device during an authentication/key exchange process may be registered in an alternative method.

The UDP is used for the RTT request and the RTT response described above. Therefore, it is necessary to notify the transmitting device beforehand of the port number at which the receiving device can receive an RTT request, as the destination port number of an RTT request. This can be done by any of the following methods: (1) a method in which a value specified in a document such as specifications is shared beforehand between the transmitting device and the receiving device, (2) a method in which the transmitting device is notified of the port number in a ready-to-receive-RTT message, (3) a method in which a command is defined for the receiving device to notify the transmitting device of the UDP port number and the receiving device uses the command to notify the transmitting device of the UDP port number prior to an RTT request, and (4) a method in which the same UDP port number as one used in TCP connection is used for authentication/key exchange.

(Second Example of AKE/RTT Measurement Phase)

A second example of the AKE/RTT measurement phase is characterized in that the unique ID of the receiving device is already registered in a unique ID list 21 of the transmitting device and the receiving device and the transmitting device performs authentication/key exchange without performing an RTT check. As described earlier as the second feature, once the RTT check between the transmitting device and the receiving device has been succeeded and the unique ID of the receiving device has been registered in the unique ID list 21 of the transmitting device, the RTT check can be omitted and it is only necessary to subsequently check whether or not the unique ID of the receiving device has been registered.

FIG. 9 is a sequence diagram showing an example of a process in which only an ID registration check is performed without performing an RTT check. The processings from authentication/key exchange to generation of an individual shared key by the transmitting and receiving devices (steps S41 to S45) are the same as steps S21 to S25 in FIG. 7.

While the receiving device then sends a ready-to-receive-RTT notification in the processings in FIG. 7, the receiving device B sends an ID search request including its unique ID to the transmitting device A in the present embodiment, instead of transmitting the notification (step S46). The unique ID included in the ID search request may or may not be encrypted.

The transmitting device receives the ID search request and searches its unique ID list 21 for the unique ID of the receiving device in communication (step S47) and returns the result as the response to the ID search request (step S48).

It is assumed in this example that an RTT check has been performed between the transmitting device and the receiving device before the authentication/key exchange. Accordingly, a message indicating that the unique ID is contained in the list is returned as the result of the ID search. If a unique ID contained in a certificate used for authentication/key exchange were used as the unique ID, the unique ID of the receiving device would be sent to the transmitting device during the authentication/key exchange process and therefore the transmitting device can determine whether it has the unique ID of the receiving device with which it communicates in the unique ID list during the authentication/key exchange. In addition, the unique ID of the receiving device may be included in the ID search request. In that case the unique ID may be sent in unencrypted form.

When the receiving device knows that its unique ID is included in the unique ID list 21 of the transmitting device, the receiving device sends a no-RTT-needed notification to the transmitting device (step S49). When receiving the no-RTT-needed notification, the transmitting device generates a common shared key Ks (step S50), encrypts it with an individual shared key Kp, and sends the encrypted Ks to the receiving device (steps S51 and S52).

If the receiving device has known by another means that the unique ID list 21 of the transmitting device contains its unique ID, the ID search result and the ID research response that follows may be skipped and the no-RTT-needed notification may directly be sent.

When the receiving device sends the no-RTT-needed notification to the transmitting device, the receiving device may include its unique ID in the no-RTT-needed notification and the transmitting device may search the unique ID list for the unique ID.

(Content Transmission Phase)

The contents transmission phase will be described below. FIG. 10 is a sequence diagram showing an example of contents transmission phase process performed between a transmitting device A and the receiving device B. First, the receiving device sends an check-Ks-number request in order to check whether the transmitting device has the common shared key Ks held by the receiving device (step S61). The transmitting device sends a Ks number corresponding to the Ks held by the transmitting device (step S62). The receiving device checks to determine whether the Ks number sent from the transmitting device matches the Ks number held by the receiving device (step S63).

The AKE/RTT measurement phase and the contents transmission phase are not always performed continuously. They may be separate from each other in time. If the transmitting device is rebooted and Ks is updated during a time interval between them, the receiving device cannot detect it. In order to determine whether the transmitting device from which the receiving device will request contents shares the same Ks as the one held by the receiving device, the receiving device performs the Ks check described above. If the receiving device can determine that the transmitting device and the receiving device obviously shares the same Ks in the case where the contents transmission phase immediately follows the AKE/RTT measurement phase, the Ks check can be omitted.

Then, the receiving device sends a contents sending request (step S64). The contents sending request includes its unique ID encrypted with an individual shared key Kp. If HTTP is used as the AV transmission protocol for the contents, the contents sending request is equivalent to an HTTP GET request. The encrypted unique ID may be included in the request header of the GET request as one entity.

The transmitting device receives the contents sending request, decrypts the encrypted unique ID of the receiving device with the individual shared key Kp, and searches its unique ID list 21 for the unique ID (step S65). If the unique ID is contained in the list, it means that the RTT between the transmitting device and the receiving device with which the transmitting device is communicating has already been checked. Therefore, the transmitting device encrypts the contents with the common shared key Ks and sends it (step S66). A message may be included as an entity in the header of an HTTP Response sent along with the contents, indicating that the ID registration check has succeeded.

What is important here is that the receiving device uses the key Kp shared only between the transmitting device and the receiving device to encrypt its unique ID to be sent. If it is only necessary to send the unique ID in a manner that the unique ID cannot be guessed by devices other than the transmitting device and the receiving device, the value Ks which is shared by the transmitting device with each of the receiving devices which have successfully performed authentication/key exchange with the transmitting device may be used. However, Ks cannot be used to encrypt the unique ID on this purpose because it is required for the transmitting device to measure that it transmits the contents to which receiving device as described below.

The process sequence in FIG. 9 has been described in which an ID registration check is performed without an RTT check. As described earlier as the third feature, the transmitting device holds the unique ID of the receiving device in the unique ID list 21 for a restricted period. That is, the transmitting device measures the time for which contents are being sent to the receiving device or the amount of contents being sent to the receiving device. When a predetermined out time is reached after the transmission of the contents is started or a predetermined amount of the contents has been transmitted, the transmitting device deletes the registered unique ID of the receiving device. In order that the transmitting device shall be able to measure the registration period of a unique ID of the receiving device, the transmitting device must determine which receiving device sent a contents sending request, before it sends a contents.

Figure 11:
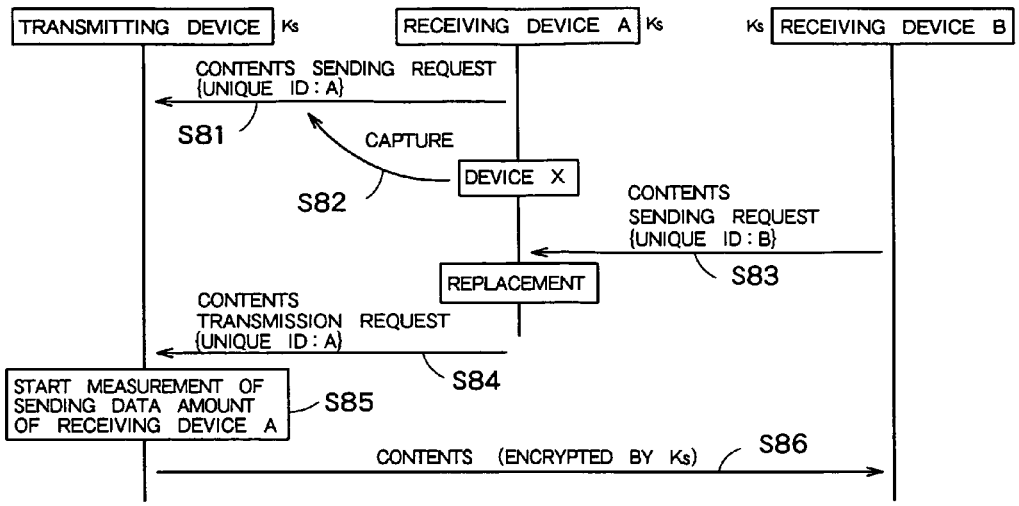
FIG. 11 is a sequence diagram showing an example of a process in which a problem arises when a common shared key Ks is used to encrypt the unique ID of the receiving device.

FIG. 11 is a sequence diagram showing an example of a process in which a problem arises when a common shared key Ks is used to encrypt the unique ID of the receiving device. The assumption in FIG. 11 is that receiving devices A and B share a common shared key Ks with the transmitting device.

First, the receiving device A encrypts its unique ID with the Ks and sends contents sending request (step S81). Suppose that a malicious device X copies the encrypted unique ID and stores the copy in it (step S82).

Then, the receiving device B encrypts its unique ID with the same Ks and sends it (step S83). The device X replaces the ID with the unique ID A that it obtained previously and sends it to the transmitting device (step S84). Then, the transmitting device determines that the contents sending request is sent from receiving device A and starts measurement of the amount of data being transmitted to receiving device A in spite of the fact that the request is sent from receiving device B (step S85). Because the contents are encrypted with the common shared key Ks and sent (step S86), receiving device B, which has the Ks, can decrypt the contents.

According to the present embodiment, TCP connection used in the AKE/RTT phase and TCP connection used in the contents transmission phase differ from each other, as has been described. The former TCP connection is used by the receiving device to encrypt its unique ID by means of a value shared between the transmitting device and the receiving device on a individual basis and to send it to the transmitting device and is used by the transmitting device to check whether the unique ID it received is registered in its specific ID table. If the check is successful, the transmitting device uses the latter TCP connection to encrypt and transmit contents to the receiving device.

While a method for determining whether the unique ID of the receiving device is registered in the unique ID list 21 in the transmitting device has been described with reference to FIG. 9, other methods for defining an ID search request and ID search result may be used: (1) a method in which the definitions are included in an HTTP header and (2) a method in which they are defined as one of authentication/key exchange commands.

In the method in which the definitions are included in an HTTP header, the ID search request is defined as an entity in an HTTP request header, the unique ID of the receiving device is encrypted with an individual shred key Kp, the encrypted unique ID is inserted in an HTTP HEAD request, and the request is sent to the transmitting device. A HEAD request is one of HTTP commands defined for the receiving device to obtain attached information such as the byte length of a contents, rather than the contents itself. If the unique ID of the receiving device is contained in the unique ID list 21, the transmitting device returns a Response code indicating the fact in response to the HTTP HEAD request. Otherwise, it returns an HTTP error message code. This process is the same as the TCP connection for transmitting and receiving contents that is shown in FIG. 10 in that a HTTP request is sent. Therefore, contents transmitting unit and an ID searching unit can be implemented as a single unit and thus the configuration of a device can be simplified.

As has been described, the range within which contents can be transmitted can be restricted by using RTT in this embodiment. Because the RTT changes according to the physical layer of the transmission channel or the traffic on the transmission channel, RTT check does not always succeed at the first try even if the transmitting device and the receiving device are connected onto a home network. Therefore, considering that an RTT request and response are performed a number of times in succession, a sequence number is assigned to each RTT request and response so that how many RTT measurement retries have been performed can be known.

Furthermore, an individual shared key shared between the transmitting device and the receiving device through authentication/key exchange is used to generate and validate a MAC in order to make sure that an RTT request and RTT response are sent from valid devices to be communicated.

A receiving device must immediately return an RTT response to an RTT request received from the transmitting device. Depending on the capacity of the receiving device, the receiving device may not be able to return an RTT response in a short time if it calculates a MAC after receiving an RTT request. Therefore, the receiving device is enabled to calculate a MAC beforehand and to subsequently verify that the MAC is valid.

According to the present embodiment, TCP connection used in the AKE/RTT measurement phase differs from TCP connection used in the contents transmission phase. The AKE/RTT measurement phase and the contents transmission phase may be distant from each other in terms of time. If a number of receiving devices are connected to a network, the transmitting device must determine which of the receiving device has sent the contents sending request or whether the receiving device has performed an AKE/RTT phase and its ID has been registered or not. Therefore, the receiving device according to the present embodiment encrypts its unique ID with an individual shred key Kp and sends the ID in addition to the contents sending request to a transmitting device so that it can notify the transmitting device that registration of the ID of the receiving device has been completed.

(Error Handling)

Error handling will be described below. FIGS. 12 to 16 are sequence diagrams showing an example of a process performed when an error occurs on the transmitting or receiving device.

(Error Handling: Failure Due to an Error on the Transmitting Device)

Figure 12:
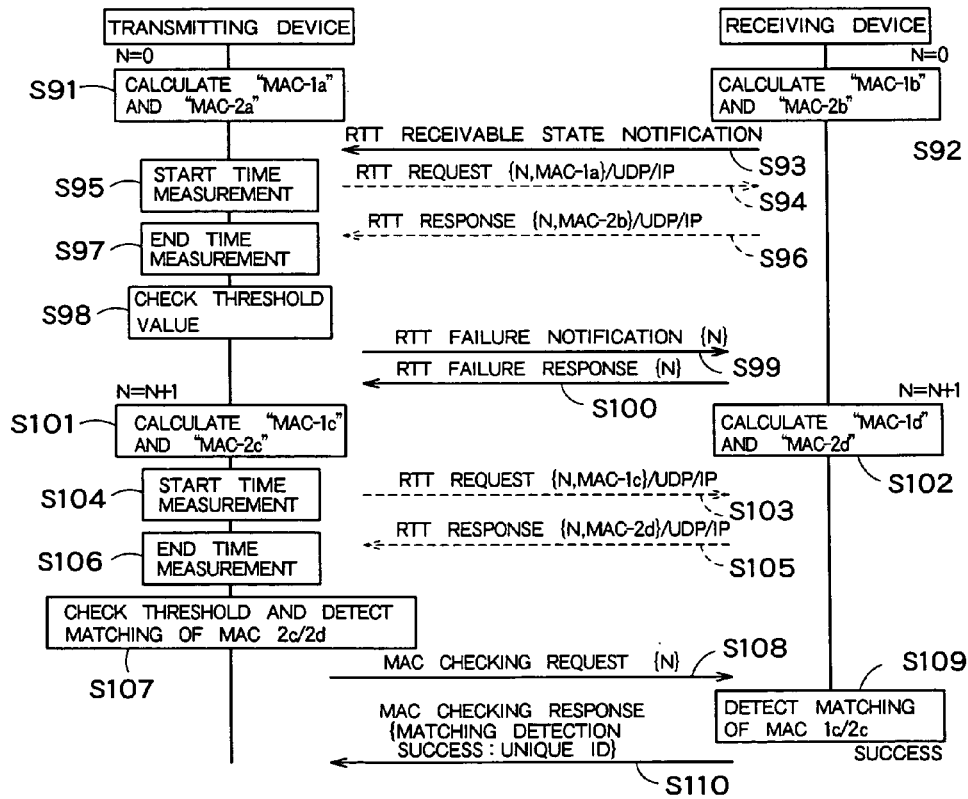
FIG. 12 shows a sequence diagram showing an example of error handling performed if an RTT response received from the receiving device during an RTT check process is delayed beyond a predetermined threshold.

FIG. 12 shows a sequence diagram showing an example of error handling performed if an RTT response received from the receiving device during an RTT check process is delayed beyond a predetermined threshold. The process until the RTT response is received from the receiving device (steps S91 to S97) is the same as that shown in FIG. 7.

If the transmitting device fails to check the threshold of RTT (step S98), it sends a message to the receiving device, notifying the receiving device of the failure of the RTT check (step S99), and updates the sequence number N to calculate new message authentication codes MAC-1$c$ and 2$c$ (steps S101). In addition, the transmitting device having received the RTT failure notification updates the sequence number N to calculate new message authentication codes MAC-1$d$ and 2$d$ (steps S100 and S102). MAC-1$c$, MAC-1$d$, MAC-2$c$, and MAC-2$d$ are calculated by using the following equations (3) and (4).

$$\text{MAC-1}c=\text{MAC1}d=\text{Encryption}(Kp,Ra\psi Rb\psi N+1)\text{upper } X \text{ bits} \quad (3)$$

$$\text{MAC-2}c=\text{MAC2}d=\text{Encryption}(Kp,Ra\psi Rb\psi N+1)\text{lower } Y \text{ bits} \quad (4)$$

where the notation "$\psi$" denotes the concatenation.

In this example, the sequence number is incremented by 1. The recalculated MACs are used to repeat the RTT check (steps S103 to S110).

In the example shown in FIG. 12, MACs are recalculated after the RTT measurement fails. If the computing power of the transmitting device or the receiving device is so low to take long time to calculate the MACs, it may take long time to successfully complete the RTT check. A process for improving this is shown in FIG. 13.

Figure 13:
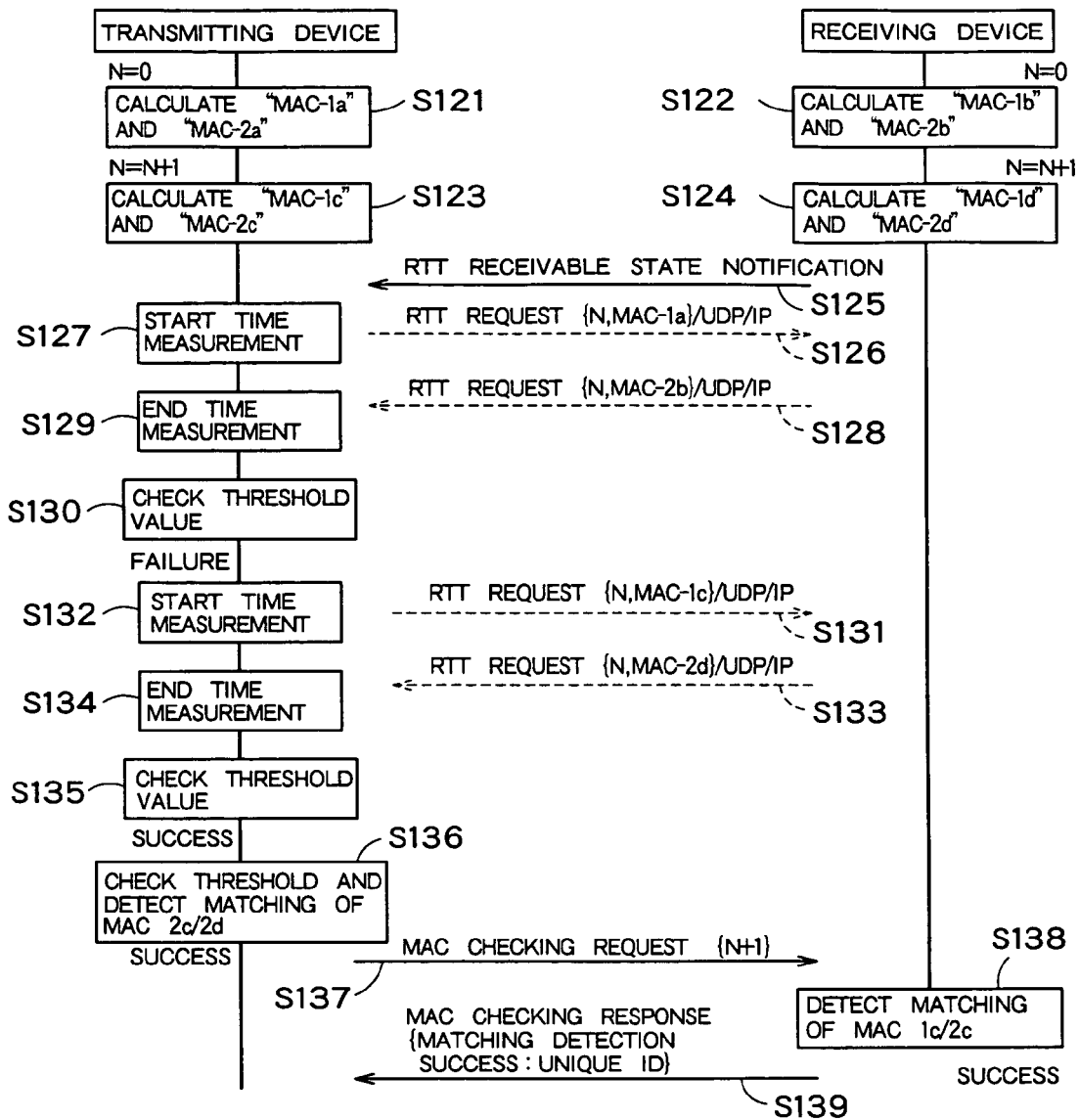
FIG. 13 is a sequence diagram showing one example of processing which improves the processings of FIG. 12.

In FIG. 13, the transmitting device and the receiving device calculate a number of message authenticates codes and store them locally prior to an RTT check (steps S121 to S124). After completing the calculation of the MACs, the receiving device sends a ready-to-receive-RTT notification to the transmitting device (step S125). In response to the notification, the transmitting device sends RTT requests sequentially (steps S131 to S135) without transmitting an RTT failure notification even if an RTT check fails (steps S126 to S130). This can eliminate the time required for recalculating MACs and providing RTT failure notifications and responses, thus more RTT checks can be performed in a short period of time.

Because RTT requests and responses are sent and received by using UDP, packets lost on a communication path are not resent. Accordingly, the transmitting device cannot always receive an RTT response. Therefore, a timeout threshold may be set so that if the transmitting device does not receive an RTT response within a predetermined period of time after it sends an RTT request, it sends the next RTT request. Furthermore, a function may be provided that measures the number of RTT requests caused by timeouts and if RTT requests are persistently made, aborts the RTT check.

If an RTT requests are sent repeatedly, a long period of time may elapses before the RTT check can be successfully completed and the TCP connection for authentication/key exchange may be disconnected due to a timeout. To prevent such disconnection of TCP connection, NULL data may be sent within a predetermined period of time during a RTT check process.

FIG. 14 is a sequence diagram showing an example of error handling performed if an ID registration check fails on a transmitting device in contents transmission phase. As described earlier as the third feature, after the transmitting device sends a predetermined amount of data to the receiving device, it discards the unique ID of that receiving device (step S147). Therefore, the receiving device must perform another RTT check during the next authentication/key exchange (step S149).

If the transmitting device receives a contents sending request while the unique ID of the receiving device is not registered, the transmitting device rejects transmitting a content. A rejection message may be (1) defined in one entity of Response to an HTTP GET request that indicates that the ID check failed, or (2) sent as an error code for HTTP Response defined in RFC2616 that indicates the contents does not exist, or (3) defined as one of commands used for authentication/key exchange.

A command may be defined that is used when the transmitting device discards the unique ID of the receiving device (step S167) as shown in FIG. 15 to notify the receiving device of the discard of the unique ID of the receiving device (step S170). In that case, the receiving device must perform an RTT check and register its unique ID in the transmitting device before transmitting the next contents request.

(Error Handling: Failure Due to an Error on the Receiving Device)

Next, a process performed where an error occurs on the receiving device will be described below.

FIG. 16 is a sequence diagram showing an example of a process for transmitting an error message to a transmitting device if matching of MAC-1a and MAC-1b in a MAC check fails. The transmitting device and the receiving device perform authentication/key exchange (step S181). If the authentication/key exchange is successful, each of the transmitting and receiving devices generates the individual shared key Kp (steps S182 and S183).

Then, RTT requests and responses are made in a manner similar to that in FIG. 13 (steps S184 to S189). If the transmitting device succeeds in the RTT check and matching of message authentication codes MAC2a and MAC2b (step S190), the transmitting devices provides a MAC check request to the receiving device (step S191).

If the receiving device fails the matching of message authentication codes MAC2a and MAC2b (step S192), the receiving device provides a MAC check response to the transmitting device, indicating that the matching has failed (step S193).

Then, each of the transmitting device and the receiving device performs error handling (steps S194 and S195).

FIG. 17 is a sequence diagram showing an example of error handling performed by the receiving device. If the transmitting device is turned off or the communication cable is disconnected from the transmitting device after the transmitting device registers the unique ID of the receiving device in the unique ID list 21 (step S204), the unique ID registered in the unique ID list 21 is automatically discarded.

When the receiving device subsequently sends a request for checking the common shared key Ks to the transmitting device (step S205), the transmitting device sends the common shared key Ks number held by it (step S206). The receiving device receives the Ks number and matches it with its Ks number (step S207) and the matching fails in this case. Consequently, the receiving device performs predetermined error handling (step S208).

At least part of the transmitting and receiving devices described above may be implemented by hardware or software. If at least part of the transmitting device and/or receiving devices are implemented by software, a program that implement at least some of the functions of the transmitting device and/or receiving device may be stored on a recording medium such as a floppy disk or a CD-ROM and read by a computer. The recording medium is not limited to a portable medium such as a magnetic disk or optical disk. It may be a fixed recording medium such as a hard disk unit or a memory.

A program that implements at least some of the functions of the transmitting device and/or receiving devices may be delivered through a communication network (which may be a wireless network) such as the Internet. Furthermore, the program may be delivered in encrypted, modulated, or compressed form through a wired or wireless network such as the Internet, or may be stored on a recording medium and delivered.

What is claimed is:

1. An information processing apparatus which transmits encrypted contents for copyright protection to a communication apparatus via a network, comprising:

an authentication/key exchange unit configured to perform authentication/key exchange processing with the communication apparatus through a first communication connection, and generate a first key shared with the communication apparatus;

a round trip time measuring unit configured to send a round trip time measuring request including an encrypted value obtained by encrypting a measuring request identifier to the communication apparatus through the first communication connection, the measuring request identifier is updated every time the round trip time measuring request is sent and shared with the communication apparatus, to measure the round trip time indicating a time that a measuring request response for the request is received, and configured to check whether the measured round trip time is within a predetermined time, to check whether an encrypted value included in the measuring request response coincides with a value which is obtained by encrypting the measuring request identifier by using the first key, and to check whether a transmitting source of the round trip request response is the communication apparatus sharing the first key;

an unique ID receiver which receives identification information unique to the communication apparatus encrypted by using the first key through the first communication connection when the round trip time measuring unit succeeds in the checking, and decrypts the unique identification information;

an ID register unit configured to register the identification information unique to the communication apparatus decrypted by the unique ID receiver;

a common key transmitter which encrypts a second key used for contents transmission by using the first key and sends the encrypted second key through the first communication connection when the round trip time measuring unit succeeds in the checking;

an ID decryption unit configured to receive a contents sending request sent from the communication apparatus through a second communication connection and decrypt identification information unique to the communication apparatus encrypted by the first key included in the contents sending request by using the first key;

an ID checking unit configured to check whether the unique identification information decrypted by the ID decryption unit is registered to the ID register unit; and a contents transmitter which encrypts the contents requested by the communication apparatus by using the second key and sends the encrypted contents to the communication apparatus through the second communication connection.

2. An information processing apparatus according to claim 1, further comprising an RTT measuring skip unit configured to skip the round trip time measurement sent from the communication apparatus at next time if the unique identification information of the communication apparatus is registered to the ID register unit.

3. An information processing apparatus according to claim 1, further comprising a deletion notification unit configured to notify the communication apparatus of a deletion through the first communication connection when the unique identification information is deleted from the ID register unit during transmission of the contents.

4. An information processing apparatus according to claim 1, further comprising a first authentication information generator which generates first authentication information by using round trip time measuring request identification information shared with the communication apparatus, a first random number, a second random number sent from the communication apparatus and the first key;

an authentication information checking unit configured to receive second authentication information generated by the communication apparatus by using measuring request response identification information included in the measuring request response sent from the communication apparatus, the first random number, the second random number and the first key, and check them based on the first authentication information; and an authentication information checking request unit configured to request the checking of the first authentication information to the communication apparatus when the authentication information checking unit succeeds in the checking, wherein the round trip time measuring unit sends a header of a UDP datagram, a sequence number corresponding to the round trip time measuring request identification information of which a value is updated every time the round trip time measuring request is performed, and the round trip time measuring request including the first random number and the sequence number, and receives the measuring request response including the second random number and the sequence number.

5. An information processing apparatus according to claim 1, wherein the ID checking unit receives the identification information unique to the communication apparatus, which is encrypted by the first key and included in an HTTP request header, when HTTP is used for the contents sending request sent from the communication apparatus.

6. An information processing apparatus according to claim 1, further comprising a receivable state notification receiver which receives a notification from the communication apparatus, which notifies that the communication apparatus is in a state where the communication apparatus can receive the round trip time measuring request, wherein the round trip time measuring unit sends the round trip time measuring request to the communication apparatus after the receivable state notification is received.

7. An information processing apparatus according to claim 1, further comprising:

an ID search request receiver which receives a request for searching the identification information unique to the communication apparatus sent from the communication apparatus, before the round trip time measuring request is sent to the communication apparatus;

an ID search unit configured to search whether the identification information unique to the communication apparatus is registered to the ID register unit, based on the ID search request;

a search result transmitter which sends a result searched by the ID search unit to the communication apparatus; and a no-necessity notification unit configured to receive a notification from the communication, which indicates that the communication apparatus does not need to measure the round trip time, wherein the round trip time measuring unit cancels the round trip time measuring request when the ID searching unit confirms registration to the ID register unit and the communication apparatus receives a no-necessity notification of the round trip time measuring request.

8. An information processing apparatus which transmits encrypted contents for copyright protection to a communication apparatus via a network, comprising:

an authentication/key exchange unit configured to perform authentication/key exchange processing with the communication apparatus through a first communication connection, and generate a first key shared with the communication apparatus;

a round trip time measuring unit configured to send a round trip time measuring request including an encrypted value obtained by encrypting a measuring request identifier to the communication apparatus through the first communication connection, the measuring request identifier is updated every time the round trip time measuring request is sent and shared with the communication apparatus, to measure the round trip time indicating a time that a measuring request response for the request is received, and configured to check whether the measured round trip time is within a predetermined time, to check whether an encrypted value which is included in the measuring request response coincides with a value obtained by encrypting the measuring request identifier by using the first key and to check whether a transmitting source of the round trip request response is the communication apparatus sharing the first key;

a common key transmitter which encrypts a second key used for contents transmission by using the first key and transmits the encrypted second key through the first communication connection when the round trip time measuring unit succeeds in the checking; and a contents transmitter which encrypts the contents requested by the communication apparatus by using the second key and sends the encrypted contents to the communication apparatus through the second communication connection.

9. An information processing apparatus according to claim 8, further comprising an ID register unit configured to register the identification information which is unique to the communication apparatus and is sent from the communication apparatus, the identification information being included in its certificate used in the authentication/key exchange processing through the first communication connection when the round trip time measuring unit succeeds in the checking.

10. An information processing apparatus according to claim 9 further comprising an RTT measuring skip unit configured to skip the round trip time at next time if the unique identification information is registered to the ID register unit.

11. An information processing apparatus according to claim 8, further comprising a first authentication information generator which generates first authentication information by using round trip time measuring request identification information shared with the communication apparatus, a first random number, a second random number sent from the communication apparatus and the first key;

an authentication information checking unit configured to receive second authentication information generated by the communication apparatus by using measuring request response identification information included in the measuring request response sent from the communication apparatus, the first random number, the second random number and the first key, and check them based on the first authentication information; and an authentication information checking request unit configured to request the checking of the first authentication information to the communication apparatus when the authentication information checking unit succeeds in the checking, wherein the round trip time measuring unit sends a sequence number corresponding to the round trip time measuring request identification information of which a value is updated every time the round trip time measuring request is performed, and the round trip time measuring request including the sequence number, and receives the measuring request response including the second random number and the sequence number.

12. An information processing apparatus according to claim 8, further comprising a receivable state notification receiver which receives a notification from the communication apparatus, which notifies that the communication apparatus is in a state that the communication apparatus can receive the round trip time measuring request, wherein the round trip time measuring unit sends the round trip time measuring request to the communication apparatus after the receivable state notification is received.

13. An information processing apparatus according to claim 9, further comprising:

an ID search request receiver which receives a request for searching the identification information unique to the communication apparatus sent from the communication apparatus, before the round trip time measuring request is sent to the communication apparatus;

an ID search unit configured to search whether the identification information unique to the communication apparatus is registered to the ID register unit, based on the ID search request;

a search result transmitter which sends a result searched by the ID search unit to the communication apparatus; and a no-necessity notification unit configured to receive a notification from the communication, which indicates that the communication apparatus does not need to measure the round trip time measuring request, wherein the round trip time measuring unit cancels the round trip time measuring request when the ID searching unit confirms registration to the ID register unit and the communication apparatus receives a no-necessity notification of the round trip time measuring request.

14. An information processing apparatus which receives encrypted contents for copyright protection sent from a communication apparatus via a network, comprising:

an authentication/key exchange unit configured to perform authentication/key exchange processing with the communication apparatus by using a first communication connection and generate a first key shared with the communication apparatus;

a round trip time measuring request response transmitter which receives a round trip time measuring request sent from the communication apparatus and including a first encrypted measuring request identifier encrypted by the first key, and sends a round trip time measuring request response including a second encrypted measuring request identifier obtained by encrypting a measuring request identifier by the first key, the measuring request identifier is shared with the communication apparatus and updated every time the round trip time measuring request is conducted;

an ID transmitter which sends unique identification information encrypted by using the first key to the communication apparatus through the first communication connection when a round trip time measurement conducted with the communication apparatus fulfills a predetermined condition;

a common key receiver which receives a second key encrypted by using the first key, which is sent by the communication apparatus through the first communication connection, when the round trip time measurement fulfills the predetermined condition;

a contents request transmitter which sends a contents sending request to the communication apparatus through a second communication connection; and a contents receiver which receives the contents encrypted by using the second key, which is sent from the communication apparatus through the second communication connection, and decrypts the contents.

15. An information processing apparatus according to claim 14, further comprising:

a first authentication information generator which generates first authentication information generated by using round trip time measuring request response identification information shared with the communication apparatus, a first random number, a second random number sent from the communication apparatus and the first key;

an authentication information checking unit configured to receive the round trip time measuring request identification information included in the round time measurement request sent from the communication apparatus, the first random number, the second random number and the first key, and check them based on the first authentication information; and a checking result transmitter which transmits a result checked by the authentication information checking unit to the communication apparatus, wherein the round trip time measuring request response transmitter receives a header of UDP datagram, a sequence number corresponding to the round trip time measuring request response updated every time the round trip time measuring request is conducted, and a round trip time measuring request including the second random number and the sequence number, and sends the header of UDP datagram, the sequence number and the round trip time measuring request response including the first random number and the sequence number.

16. An information processing apparatus according to claim 14, wherein the ID transmitter sends the encrypted unique identification information encrypted by the first key to the communication apparatus including in HTTP request header, when HTTP is used for the contents sending request.

17. An information processing apparatus according to claim 14, further comprising a receivable state notification unit configured to send a notification indicating that the communication apparatus is in a state where the round trip time measuring request can be received from the communication apparatus.

18. An information processing apparatus according to claim 14, further comprising:

an ID search request transmitter which requests the communication apparatus to search whether the communication apparatus holds the unique identification information before receiving the round trip time measuring request from the communication apparatus;

a search result receiver which receives a result searched by the communication apparatus based on the ID search request; and a measuring request no-necessity notification unit configured to notify the communication apparatus that the round trip time measuring request is unnecessary when detected that the communication apparatus holds the unique identification information based on a result received by the search result receiver.

19. An information processing apparatus which receives encrypted contents for copyright protection sent from a communication apparatus via a network, comprising:

an ID transmitter which sends an authentication request and unique identification information to the communication apparatus through a first communication connection;

an authentication/key exchange unit configured to perform authentication/key exchange processing with the communication apparatus by using the first communication connection and generate a first key shared with the communication apparatus;

a round trip time measuring request response transmitter which receives a round trip time measuring request sent from the communication apparatus and including a first encrypted measuring request identifier encrypted by the first key, and sends a round trip time measuring request response including a second encrypted measuring request identifier obtained by encrypting a measuring request identifier by the first key, the measuring request identifier is shared with the communication apparatus and updated every time the round trip time measuring request is conducted;

a common key receiver which receives a second key encrypted by using the first key, which is sent by the communication apparatus through the first communication connection, when a result of the round trip time measurement fulfills the predetermined condition;

a contents request transmitter which sends a contents request to the communication apparatus through a second communication connection; and a contents receiver which receives the contents encrypted by using the second key, which is sent from the communication apparatus through the second communication connection, and decrypts the contents.

20. An information processing apparatus according to claim 19, further comprising:

a first authentication information generator which generates first authentication information generated by using round trip time request response identification information shared with the communication apparatus, a first random number, a second random number sent from the communication apparatus, and the first key;

an authentication information checking unit configured to receive second authentication information generated by using the round trip time measuring request identification information included in the round trip time measuring request sent from the communication apparatus, the first random number, the second random number and the first key, and check the second authentication information based on the first authentication information; and a checking result transmitter which transmits a result checked by the authentication information checking unit to the communication apparatus, wherein the round trip time measuring request response transmitter receives a round trip time measuring request including a sequence number corresponding to the round trip time measuring request updated every time the round trip time measuring request is conducted and the round trip time measuring request including the second random number and the sequence number, and sends the sequence number and a round trip time measuring request response including the first random number and the sequence number.

21. An information processing apparatus according to claim 19, further comprising a receivable state notification transmitter which transmits a receivable state notification indicating that the communication apparatus is in a state where the round trip time measuring request can be received from the communication apparatus.

22. An information processing apparatus according to claim 19, further comprising:
- an ID search request transmitter which requests the communication apparatus to search whether the communication apparatus holds the unique identification information before receiving the round trip time measuring request is received from the communication apparatus;
- a search result receiver which receives a result searched by the communication apparatus based on the ID search request; and
- a measuring request no-necessity notification unit configured to notify the communication apparatus that the round trip time measuring request is unnecessary when detected that the communication apparatus holds the unique identification information based on a result received by the search result receiver.

23. An information processing method which transmits encrypted contents for copyright protection from a first communication apparatus to a second communication apparatus via a network, comprising:
- performing an authentication/key exchange processing between the first and second communication apparatuses through a first communication connection, to generate a first key shared between the first and second communication apparatuses;
- transmitting a round trip time measuring request including an encrypted value obtained by encrypting a measuring request identifier from the first communication apparatus to the second communication apparatus through the first communication connection, the measuring request identifier being updated every time the round trip time measuring request is sent and shared with the communication apparatus, to measure a round trip time indicating a time that a measuring request response for the request is received, checking whether the measured round trip time is within a predetermined time, checking whether an encrypted value included in the measuring request response coincides with a value being obtained by encrypting the measuring request identifier by using the first key, and checking whether a transmitting source of the round trip request response is the communication apparatus sharing the first key;
- encrypting a second key used for contents transmission and transmitting the second key to the second communication apparatus through the first communication connection when the first communication apparatus succeeds in both of the checking; and
- encrypting contents requested from the second communication by using the second key, and transmitting the encrypted contents to the second communication apparatus through a second communication connection.

24. A computer readable medium comprising a computer program code capable of executing by computer, which transmits encrypted contents for copyright protection from a first communication apparatus to a second communication apparatus via a network, the computer program comprising:
- performing an authentication/key exchange processing between the first and second communication apparatuses through a first communication connection, to generate a first key shared between the first and second communication apparatuses;
- transmitting a round trip time measuring request including an encrypted value obtained by encrypting a measuring request identifier from the first communication apparatus to the second communication apparatus through the first communication connection, the measuring request identifier being updated every time the round trip time measuring request is sent and shared with the communication apparatus, to measure a round trip time indicating a time that a measuring request response for the request is received, checking whether the measured round trip time is within a predetermined time, checking whether an encrypted value included in the measuring request response coincides with a value being obtained by encrypting the measuring request identifier by using the first key, and checking whether a transmitting source of the round trip request response is the communication apparatus sharing the first key;
- encrypting a second key used for contents transmission and transmitting the second key to the second communication apparatus through the first communication connection when the first communication apparatus succeeds in both of the checking; and
- encrypting contents requested from the second communication by using the second key, and transmitting the encrypted contents to the second communication apparatus through a second communication connection.

25. An information processing apparatus according to claim 8, wherein the round trip time measuring unit increments the measuring request identifier by 1 every time the round trip time measuring request is sent.

26. An information processing apparatus according to claim 8, wherein the round trip time measuring unit sends the round trip time measuring request including an upper bit or upper bit string of the encrypted value obtained by encrypting the measuring request identifier by the first key, and receives the measuring request response including a lower bit or lower bit string of the encrypted value obtained by encrypting the measuring request identifier by the first key.

* * * * *